A. J. CASHEL.
LEVEL.
APPLICATION FILED OCT. 1, 1915.

1,203,702.

Patented Nov. 7, 1916.

Inventor
A. J. Cashel
By Watson E. Coleman
Attorney

UNITED STATES PATENT OFFICE.

ANDREW J. CASHEL, OF CASPER, WYOMING, ASSIGNOR OF ONE-THIRD TO WILLIAM CASHEL AND ONE-THIRD TO WILLIAM SNARE, OF CASPER, WYOMING.

LEVEL.

1,203,702.      Specification of Letters Patent.      Patented Nov. 7, 1916.

Application filed October 1, 1915. Serial No. 53,612.

*To all whom it may concern:*

Be it known that I, ANDREW J. CASHEL, a citizen of the United States, residing at Casper, in the county of Natrona and State of Wyoming, have invented certain new and useful Improvements in Levels, of which the following is a specification, reference being had to the accompanying drawings.

This invention comprehends certain new and useful improvements in levels, and the invention has for its primary object a durable and efficient construction of water level, the parts of which may be easily and cheaply manufactured and readily assembled and not liable to get out of order, and which may be packed, when not desired for use, in a minimum of space, and shipped without danger of breakage.

The invention has for a further object a device of this kind in which the parts are so arranged that the screw caps with which the level indicating devices are equipped can be screwed down tight, so as to close the valve seats formed in said devices, and thereby prevent any leakage, the parts being further arranged so that by merely backing off the screw caps to a slight degree without entirely detaching them, the parts may be restored to their operative condition for actual service. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1:
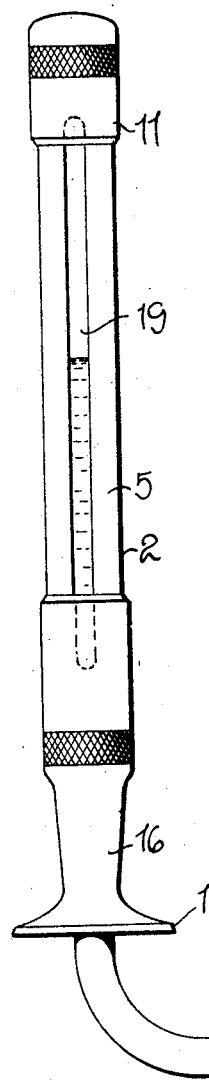
Figure 1:
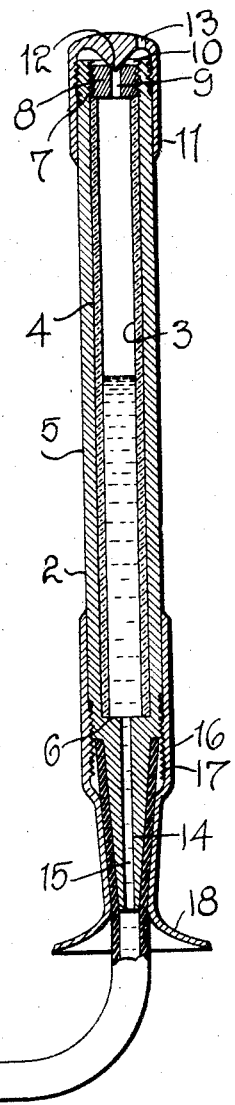
Figure 2:
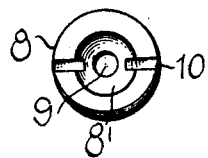

Figure 1 is a view, partly in elevation and partly in section, of my improved water level, the flexible conduit or hose that connects together the two level indicating devices being broken away to indicate that it may be of any desired length. Fig. 2 is a detail top plan view of a plug employed and hereinafter more specifically described.

Corresponding and like parts are referred to in the following description and accompanying drawing by like reference characters.

In carrying out my invention, I provide a flexible conduit or hose 1 of rubber or the like, which may be of any desired length as, for example, one hundred feet more or less, and connected to the ends of this conduit a the level indicating devices 2 that are of corresponding construction and formation, and consequently a description of one will suffice for both.

As best illustrated by the right-hand indicating device in Fig. 1 of the accompanying drawing, said device comprises preferably a glass tube 3 of any desired thickness, diameter and length, open from end to end, and contained within a longitudinally extending and attenuated chamber 4 formed in a sleeve or barrel 5 of brass or other metal, said tube abutting at one end against the shoulder 6 in which one end of the chamber 4 terminates. Beyond the other end of the tube 4, the cylinder sleeve or barrel 5 is formed with interior screw threads for engagement by a plug 8 which is adapted to screw in this end of the sleeve to abut against the adjoining end of the tube, and said plug is formed with a preferably centrally disposed passage 9 extending therethrough. For convenience in applying and removing the plug, it is formed at its outer or free end with a kerf or slot 10 to receive the blade of a screw-driver or other instrument. A cap 11 screws upon this end the sleeve 5, as clearly illustrated in the drawing, said cap being formed with an interior thickened wall in its top that constitutes a conical valve 12 designed to rest upon a cup-shaped valve seat 8', which is formed in the top of the plug 8 so as to close the opening 9 and preferably said cap is also formed with an aperture 13 extending therethrough, whereby communication may be established between the interior of the tube 3 and the exterior atmosphere by merely backing off the screw-cap to some extent, instead of entirely removing it, so as to overcome or do away with the partial vacuum or pressure that would otherwise be formed within the tube above the water level therein. By screwing the cap 11 down upon the plug, it is obvious that all leakage of the water within the tube and through parts of the device will be prevented.

The sleeve 5 is formed at its relatively lower end with a tapered neck 14 of any desired angle of taper, and with a longitudinal passage 15 extending therethrough so as to establish communication between the interior of the conduit 1 and the interior of the tube 3, said neck being inserted within one end of the hose or conduit as shown, and being preferably wedged or clamped in place by means of an elongated collar 16 formed with interior screw-threads 17, whereby it may be adjusted longitudinally, as required, upon the sleeve 5, and preferably said collar is formed at one end with a bell or outward flare 18, so as to provide a clearance for the conduit, as it is bent in service and without any danger of injuring same.

In order to view the level of the water or other liquid within the tube 3, the sleeve 5 is formed with any desired number of longitudinally extending slots 19, as clearly shown to the left of Fig. 1.

The use of this device will be obvious to those skilled in the art. In using the level, one indicating device is seated or disposed at a point to which the level is to be referred and the other indicating device is carried to the place at which the level is to be determined, the length and flexibility of the tube permitting of the separation of the indicating device either over a straight or a circuitous route.

The indicating device at the point at which the level is to be determined is brought to the same elevation as the indicating device at the point where the level is to be referred by raising or lowering the first named indicating device until both columns of water are of equal height.

The specific advantages of the detailed construction illustrated are many. It will be seen that it is possible to readily connect or disconnect the pipe 1 from either of the level indicating devices by simply unscrewing the collar 16 or by securing it in place. Inasmuch as the collar is tapered to conform to the exterior taper of the neck 14, it will be obvious that the pipe 1, which is of rubber or other suitable compressible material, will be compressed by the collar 16 and a water-tight joint therefore formed between the pipe 1 and the indicating device. Inasmuch as the neck 14 tapers upward, that is toward the free end of the indicating device 2, and the collar 16 tapers in the same direction, it is obvious that the indicating device cannot be pulled off the tube 2 accidentally. Furthermore, it will be seen that the glass tube 3 is securely housed at all times within the metal tube 5 so that it cannot be broken and that the glass tube is not separated or liable to drop out of the metal tube 5 even when the indicating device is detached from the hose or pipe 1. The glass tube, however, may be removed by removing the cap and removing the plug 8 but the removal of the cap 11 does not permit any accidental detachment of the glass tube 3 for the reason that this is held in place by the plug 8. It is to be likewise noted that no fine adjustment of the cap 11 relative to the opening 9 in the plug is necessary in order to secure communication between the exterior air and the interior of the tube 3. Turning the cap down closes the opening 9. Turning the cap up discloses this opening and at the same time provides the passage of air from or to the interior of the tube 3. The flaring extremity of the collar 16 or bell as it has been termed prevents any undue bending of the tube, that is, such bending of the tube as would cause the tube to crimp and prevent the passage of water through it.

From the foregoing description in connection with the accompanying drawing, the operation of my improved water level will be apparent. When the device is desired for use, the caps 11 are backed slightly off the sleeves 5 so as to establish communication between the interior of the tubes 3 to the exterior atmosphere and, as hereinbefore stated, when it is desired to carry the device from place to place, or pack it away, it is only necessary to screw up the caps 11, whereupon the valves 12 thereof will seat within the valve seat 8' and entirely shut off this communication and prevent all leakage.

While the accompanying drawing illustrates what I believe to be the preferred embodiment of my invention, it is to be understood that the invention is not limited thereto but that various changes may be made in the construction, arrangement and proportions of the parts without departing from the scope of the invention as defined by the appended claims.

What is claimed, is:

1. In a level of the character described, an indicating device including a sleeve, a tube housed therein, a plug mounted in one end of said sleeve and abutting against one end of the tube, said plug having a passage extending therethrough, and a perforated cap applicable to the end of the sleeve and provided with a protuberance adapted to close said passage, when the cap is in its applied position and forced downward against the plug; as and for the purpose set forth.

2. In a level of the character described, an indicating device including a sleeve, a tube housed therein, a plug screw threadedly mounted in one end of said sleeve and abutting against one end of the tube, said plug having a passage extending therethrough, and a cap having screw threaded engagement with the end of the sleeve and provided with a protuberance on its inner face adapted to close said passage when the cap is screwed down upon the sleeve, the cap being also formed with an aperture extending therethrough, as and for the purpose set forth.

3. In a level of the character described, an indicating device comprising a sleeve having a chamber formed therein and terminating at one end in a shoulder, a tube mounted in the chamber and abutting against the shoulder, means at one end of the sleeve engaging the sleeve and holding the tube therein, the sleeve being formed at its other end with an exteriorly tapered neck having a passage therethrough, a compressible conduit into which the neck is inserted and by which the conduit is expanded, and a collar having a cylindrical portion having screw threaded engagement with the sleeve and having a tapering portion extending concentrically to the tapering neck and the conduit and when in place clamping the conduit in place.

4. In a level of the character described, an indicating device including a tubular member, a clamping collar mounted upon the tubular member and formed at its end away from the tubular member with an outwardly flared extremity or bell, and a flexible pipe engaging the tubular member and surrounded by the collar, the flared extremity of the collar permitting the pipe to be flexed but limiting the flexing of the pipe.

In testimony whereof I hereunto affix my signature in the presence of two witnesses.

ANDREW J. CASHEL.

Witnesses:
PAT ROYCE,
WILLIAM SNARE.